(12) United States Patent
Miseldine et al.

(10) Patent No.: US 11,048,844 B1
(45) Date of Patent: Jun. 29, 2021

(54) SYSTEM AND METHOD FOR USE IN DESIGN VERIFICATION

(71) Applicant: Graphcore Limited, Bristol (GB)

(72) Inventors: Paul Miseldine, Chippenham (GB); Michael Davie, Hertfordshire (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 16/913,657

(22) Filed: Jun. 26, 2020

(51) Int. Cl.
*G06F 30/33* (2020.01)
*G06F 30/3323* (2020.01)
*G06F 119/16* (2020.01)

(52) U.S. Cl.
CPC ...... *G06F 30/3323* (2020.01); *G06F 2119/16* (2020.01)

(58) Field of Classification Search
CPC .................................................. G06F 30/3323
USPC ................................................. 716/106, 107
See application file for complete search history.

(56) References Cited

U.S. PATENT DOCUMENTS

| | | | |
|---|---|---|---|
| 7,181,708 B1 * | 2/2007 | Du et al. | G06F 30/3323 716/106 |
| 7,278,056 B2 * | 10/2007 | Hekmatpour | G01R 31/318314 714/33 |
| 8,560,985 B1 * | 10/2013 | Sahu et al. | G06F 30/33 716/106 |
| 2013/0117722 A1 | 5/2013 | Biswas et al. | |
| 2014/0068533 A1 * | 3/2014 | Goswami etal. | G06F 30/3323 716/108 |
| 2015/0199460 A1 | 7/2015 | Sundaresan et al. | |

FOREIGN PATENT DOCUMENTS

| | | | |
|---|---|---|---|
| JP | 2008097384 A | | 4/2008 |
| JP | 2016081397 A | | 5/2016 |

OTHER PUBLICATIONS

Patentability Search Report, dated Apr. 9, 2020, Patent Seekers Ltd., 21 pages.
Functional Verification Environment for I2C Master Controller Using System Verilog, M. Sukhanya, 2017 4th International Conference on Signal Processing, Communications and Networking (ICSCN-2017), Mar. 16-18, 2017, Chennai India. 6 pages.

* cited by examiner

*Primary Examiner* — Sun J Lin
(74) *Attorney, Agent, or Firm* — Haynes and Boone, LLP

(57) ABSTRACT

A method and system for improved design verification for a data processing device when performing a logic simulation. The system identifies certain corresponding coverpoints at different points in results of a logic simulation for a design. Using coverage results obtained for the design, a merging of the results is performed for the certain corresponding coverpoints in the design. In the merged results, a coverpoint is considered as covered if at least one corresponding coverpoint is covered during the logic simulation.

16 Claims, 11 Drawing Sheets

| Metric | Coverpoint | | Coverbins | Coverage |
|---|---|---|---|---|
| Line | Line 1 | | Executed, not executed | 0 of 1 |
| | Line 2 | | Executed, not executed | 0 of 1 |
| | Line 4 | | Executed, not executed | 0 of 1 |
| Condition | (a>b) & enable | | (a>b) true, enable taken, (a>b) true, enable true, (a>b) false, enable false, (a>b) false, enable true | 0 of 4 |
| Branch | (a>b) & enable | | Branch taken, not taken | 0 of 1 |
| | Else | | Branch taken, not taken | 0 of 1 |
| Toggle | a | | For each bit: Transition 1->0 Transition 0->1 | 0 of 8 |
| | b | | For each bit: Transition 1->0 Transition 0->1 | 0 of 8 |
| | count | | For each bit: Transition 1->0 Transition 0->1 | 0 of 8 |

| Metric | Coverpoint | Coverbins | Coverage |
|---|---|---|---|
| Line | Line 1 | Executed, not executed | 1 of 1 |
| | Line 2 | Executed, not executed | 0 of 1 |
| | Line 4 | Executed, not executed | 1 of 1 |
| Condition | (a>b) & enable | (a>b) true, enable false,<br>(a>b) true, enable true,<br>(a>b) false, enable false,<br>(a>b) false, enable true | 2 of 4 |
| Branch | (a>b) & enable | Branch taken, not taken | 0 of 1 |
| | Else | Branch taken, not taken | 1 of 1 |
| Toggle | a | For each bit:<br>Transition 1->0<br>Transition 0->1 | 8 of 8 |
| | b | For each bit:<br>Transition 1->0<br>Transition 0->1 | 8 of 8 |
| | count | For each bit:<br>Transition 1->0<br>Transition 0->1 | 0 of 8 |

| Metric | Coverpoint | Coverlons | Coverage |
|---|---|---|---|
| Line | Line 1 | Executed, not executed | 1 of 1 |
| | Line 2 | Executed, not executed | 1 of 1 |
| | Line 4 | Executed, not executed | 0 of 1 |
| Condition | (a>b) & enable | (a>b) true, enable false, | 2 of 4 |
| | | (a>b) true, enable true, | |
| | | (a>b) false, enable false, | |
| | | (a>b) false, enable true | |
| Branch | (a>b) & enable | Branch taken, not taken | 1 of 1 |
| | else | Branch taken, not taken | 0 of 1 |
| Toggle | a | For each bit: | 0 of 8 |
| | | Transition 1->0 | |
| | | Transition 0->1 | |
| | b | For each bit: | 0 of 8 |
| | | Transition 1->0 | |
| | | Transition 0->1 | |
| | count | For each bit: | 0 of 8 |
| | | Transition 1->0 | |
| | | Transition 0->1 | |

| Metric | Coverpoint | Coverdim | Coverage |
|---|---|---|---|
| Line | Line 1 | Executed, not executed | 1 of 1 |
| | Line 2 | Executed, not executed | 1 of 1 |
| | Line 4 | Executed, not executed | 1 of 1 |
| Condition | (a>b) & enable | (a>b) true, enable false, | 4 of 4 |
| | | (a>b) true, enable true, | |
| | | (a>b) false, enable false, | |
| | | (a>b) false, enable true | |
| Branch | (a>b) & enable | Branch taken, not taken | 1 of 1 |
| | else | Branch taken, not taken | 1 of 1 |
| Toggle | a | For each bit: | # of 8 |
| | | Transition 1->0 | |
| | | Transition 0->1 | |
| | b | For each bit: | # of 8 |
| | | Transition 1->0 | |
| | | Transition 0->1 | |
| | count | For each bit: | # of 8 |
| | | Transition 1->0 | |
| | | Transition 0->1 | |

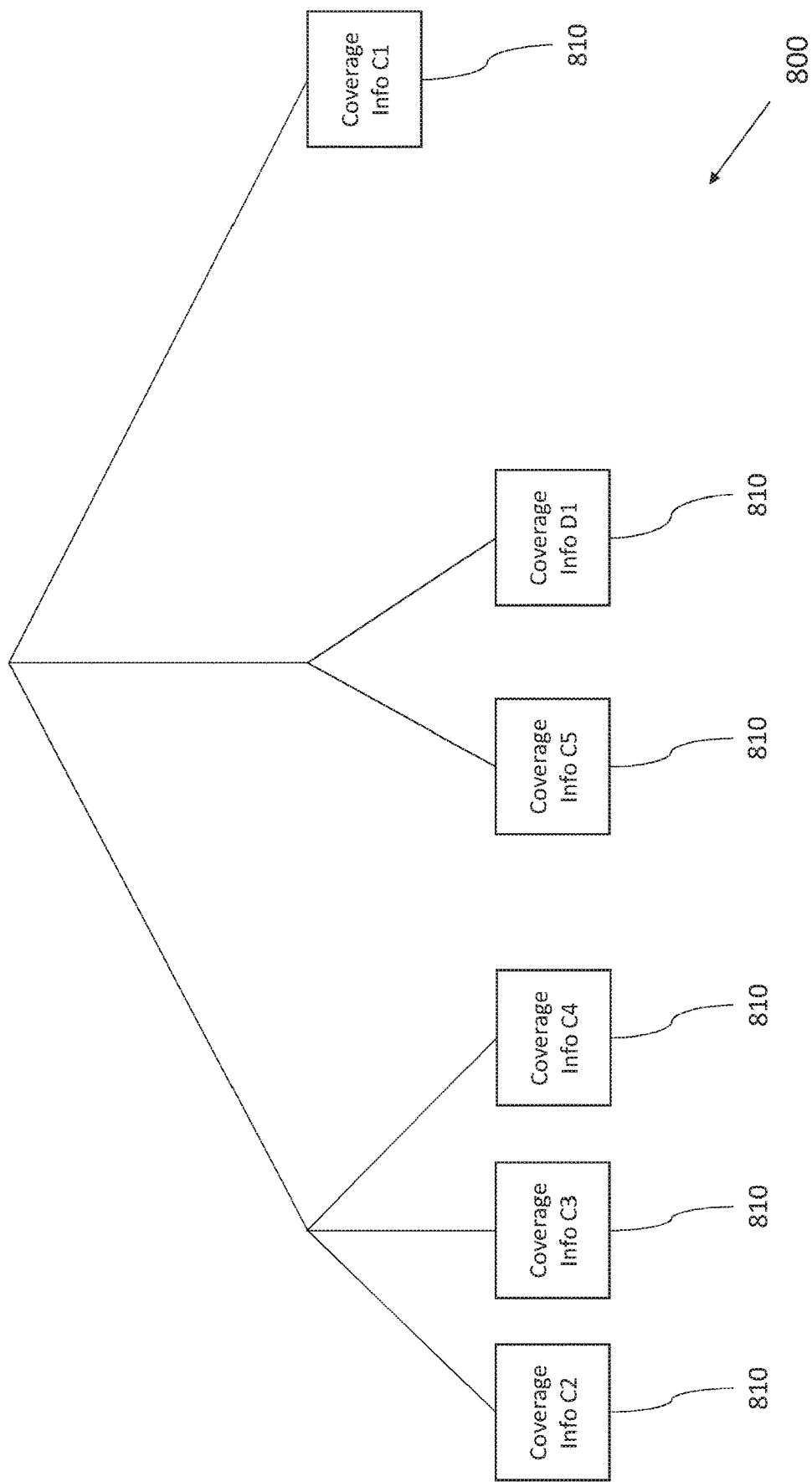

SYSTEM AND METHOD FOR USE IN DESIGN VERIFICATION

TECHNICAL FIELD

The present application relates to a system and method for use in design verification.

BACKGROUND

The design process for a processing device involves a series of stages. A first of these stages is the production of a system specification, which sets out the requirements and feasibility for a particular product. A following stage is the development of the architectural level design, at which point the operation of the integrated circuit is defined at a high level to produce an architectural specification. Following the architectural stage, the hardware design takes place at a lower level where a hardware description language (HDL) is used to produce a precise, formal description of the processing device. One HDL that is used for this purpose is Verilog.

In order to verify that the HDL description of the processing device is correct—in other words to verify that the design conforms to specification—a logic simulation is performed using the HDL description of the processing device. The HDL description of the processing device is referred to as the design under verification (DUV). Performing such a logic simulation involves providing a set of input vectors (referred to as stimulus) to the DUV. A generator generates a large number of different input vectors that are provided to the DUV. These input vectors are typically randomly generated. The simulation is performed using the input vectors to determine if the design functions as intended.

In order to fully verify the design, it is usually required to fully explore the design, by hitting (i.e. covering) each of the different coverpoints defined for the design. Examples of the different types of coverpoints to be covered include: the exercising of lines of code in the design, the toggling of different values on a bus of the processing device, different conditions relating to the values of parameters used in the processing device and different branches in the code.

Reference is made to FIG. 1A, which illustrates a function block 100 represented by 5 lines of pseudo code. This function block 100, which may be referred to as "count_a_gt_b", takes two 4 bit inputs and, when enabled by an enable signal, increments a value "count" if a is greater than b.

Reference is made to FIG. 1B, which illustrates results 150 for the function block 100 obtained from a logic simulation. The results 150 show the different coverpoints defined for the function block 100. Each coverpoint is associated with one or more coverbins, which represent the different possibilities for the respective coverpoint. As shown, there are different types of coverpoint. Coverpoints of a first type ("line") are associated with a particular line of code, and are considered as covered when the associated line of code in the HDL for the DUV has been exercised. Coverpoints of a second type ("Condition") are associated with lines containing conditional statements and are considered as covered when the different outcomes of each conditional statement in the line have been explored.

Coverpoints of a third type ("Branch") are associated with a branch in the code and are considered as covered when at least some of the code of the associated branch is exercised. Coverpoints of a fourth type ("Toggle") are associated with each variable used in the function block 100 and are considered covered when each bit of the associated variable has transitioned from 1 to 0 and from 0 to 1.

Initially, before any stimulus is provided to the function block 100, the coverage for each coverpoint is 0. This is illustrated in table 150, which shows the coverage for each coverpoint being 0. After a certain amount of stimulus is provided to the DUV, some of the coverbins will be hit, with the result that a certain level of coverage is achieved for each coverpoint. Suppose, for example, that certain stimulus is provided to the DUV, with the constraint that a=b applied, but that a and b take all possible values over the stimulus provided. Suppose also that, for this stimulus, the "enable" input takes each of the possible values, i.e. 0 or 1. The effect of these inputs on the coverage for the function block 100 is shown in the results 160 in FIG. 1C.

As shown in FIG. 1C, lines 1 and lines 4 are exercised, and so the relevant coverpoints for these lines are covered. However, since the condition a>b is not satisfied, line 2 is not exercised. Since a=b, the only coverbins hit for the conditional statement "(a>b) & enable" are those for which a>b is false. The coverage for the conditional coverpoint is, therefore, 50% (2 of 4). Only one of the branches (the "Else" branch) in the code is taken. Therefore, only one of the two branch coverpoints is covered. Even though a=b, each of the toggle coverpoints is fully covered, since a and b take the full range of values over the stimulus such that each bit is toggled from 0 to 1 and 1 to 0. However, since the condition a>b is not satisfied during supply of the stimulus, the value of count doesn't change. Therefore, the toggle coverpoint associated with count is never covered by the stimulus.

If further stimulus were supplied to the DUV, it may be possible to produce input values for the function block 100 where a b, and to thereby hit the remaining coverpoints. However, it is appreciated that a small function block, such as function block 100, would represent only a small part of a much larger design for a data processing device that would be under test using a logic simulation. To achieve full coverage for the entire design, it may be necessary to produce and apply a very large amount of stimulus. Therefore, achieving full coverage for the DUV can be a very time consuming and difficult manual process.

SUMMARY

Given the amount of time required to achieve the required coverage for a DUV, there is a want for a method that can reduce this time.

According to a first aspect, there is provided a method for use in verification of a design under verification, the design under verification comprising a plurality of function blocks, the method implemented in a data processing system and comprising: obtaining results from a logic simulation of the design under verification, wherein the results comprise coverage information for each of at least some of the plurality of function blocks, wherein the design under verification comprises a plurality of sets of identical function blocks; for each of at least some of the sets of identical function blocks, producing a merged set of results by: for each of at least one of a plurality of coverpoints in the merged set of results, setting a status for the respective coverpoint to be covered in response to determining that at least one equivalent coverpoint in the coverage information for the function blocks of the respective set of identical function blocks has been covered in the logic simulation.

A DUV often comprises sets of identical functional blocks. This is particularly the case for designs involving a large number of replicated circuits as in processing units designed for massive parallelism. The inventors have recognised that the presence of repeated identical function blocks in a DUV allows the amount of time for design verification to be reduced since, when one coverpoint belonging to one function block of a set of identical function blocks has been covered by the simulation, the remaining equivalent coverpoints belonging to the other function blocks in that set can also be considered as covered. This is implemented by producing a merged set of results for sets of identical function blocks. It is sufficient for verification purposes if the coverpoints are covered in the merged set of results without it being necessary for every coverpoint in the results of the logic simulation to be independently covered.

In some embodiments, the method comprises, for each of the at least some of the sets of identical function blocks, identifying in the results from the logic simulation, the coverage information for the function blocks of the respective set of identical function blocks by searching the results using location information for the respective set of identical function blocks in the design under verification.

In some embodiments, the location information comprises a regular expression.

In some embodiments, the design under verification comprises a plurality of hardware modules, for each of at least some of the sets of identical function blocks, each of the hardware module comprises at least one of the function blocks of the respective set of identical function blocks.

In some embodiments, each of the hardware modules is described by a same set of hardware description language code.

In some embodiments, the step of, for each of at least some of the sets of identical function blocks, producing a merged set of results comprises for each of at least one of a plurality of coverpoints in the merged set of results, setting a status for the respective coverpoint to be covered in response to determining that full coverage has been achieved by partial coverage for each of at least two equivalent coverpoints in the coverage information for the function blocks of the respective set of identical function blocks.

In some embodiments, the step of for each of at least some of the sets of identical function blocks, producing a merged set of results comprises for each of at least one of a plurality of coverpoints in the merged set of results, setting a status for the respective coverpoint to have a coverage level equal to a highest coverage level achieved by equivalent coverpoints in the coverage information for the function blocks of the respective set of identical function blocks.

In some embodiments, the method comprises reporting coverage for the design under verification, wherein the reported coverage comprises: the merged sets of results for the sets of identical function blocks; and the coverage information from the logic simulation for ones of the function blocks that are unique in the design under verification.

In some embodiments, the method comprises for each of at least one of the sets of identical function blocks: applying a waiver to at least one coverpoint in the respective merged set of results such that coverage by the logic simulation of that at least one coverpoint is not required for verification.

In some embodiments, the applying the waiver comprises searching the results from the logic simulation using a regular expression to identify the equivalent coverpoints of the respective at least one coverpoint not required for verification.

In some embodiments, the design under verification comprises Verilog code.

In some embodiments, each of the function blocks is a Verilog module.

In some embodiments, each of the sets of identical function blocks are expressed at the register transfer level in the design under verification.

In some embodiments, each of the plurality of coverpoints is a coverpoint for at least one of: a line of hardware description language code for the design under verification; an outcome of a conditional statement in the hardware description language code; a branch in the hardware description language code; and a toggle condition for a value used in one of the function blocks of the design under verification.

According to a second aspect, there is provided a data processing system for performing verification of a design under verification, the design under verification comprising a plurality of function blocks, the data processing system comprising at least one processor and at least one memory, the at least one processor configured to execute computer readable instructions stored in the at least one memory to perform: obtaining results from a logic simulation of the design under verification, wherein the results comprise coverage information for each of at least some of the plurality of function blocks, wherein the design under verification comprises a plurality of sets of identical function blocks; for each of at least some of the sets of identical function blocks, producing a merged set of results by: for each of at least one of a plurality of coverpoints in the merged set of results, setting a status for the respective coverpoint to be covered in response to determining that at least one equivalent coverpoint in the coverage information for the function blocks of the respective set of identical function blocks has been covered in the logic simulation.

According to a third aspect, there is provided a non-transitory computer readable medium configured to store a computer program which when executed by a processor is causes a method for verification of a design under verification to be carried out, the design under verification comprising a plurality of function blocks, wherein the method comprises: obtaining results from a logic simulation of the design under verification, wherein the results comprise coverage information for each of at least some of the plurality of function blocks, wherein the design under verification comprises a plurality of sets of identical function blocks; and for each of at least some of the sets of identical function blocks, producing a merged set of results by: for each of at least one of a plurality of coverpoints in the merged set of results, setting a status for the respective coverpoint to be covered in response to determining that at least one equivalent coverpoint in the coverage information for the function blocks of the respective set of identical function blocks has been covered in the logic simulation.

BRIEF DESCRIPTION OF THE DRAWINGS

For a better understanding of the present invention to show how the same may be carried into effect, reference will now be made by way of example to the accompanying drawings:

FIG. 1B illustrates an example of the coverpoints for the function block shown in FIG. 1A;

FIG. 1C illustrates an example of logic simulation results obtained for the function block shown in FIG. 1A;

FIG. 3 illustrates an example of logic simulation results obtained for a further instance of the function block shown in FIG. 1A;

FIG. 4 illustrates the result of merging the results shown in FIG. 1C with the results shown in FIG. 3;

FIG. 8 illustrates a hierarchical arrangement of the results of a logic simulation.

DETAILED DESCRIPTION

Example embodiments will now be explained in more detail with reference to the Figures.

Figure 2A:
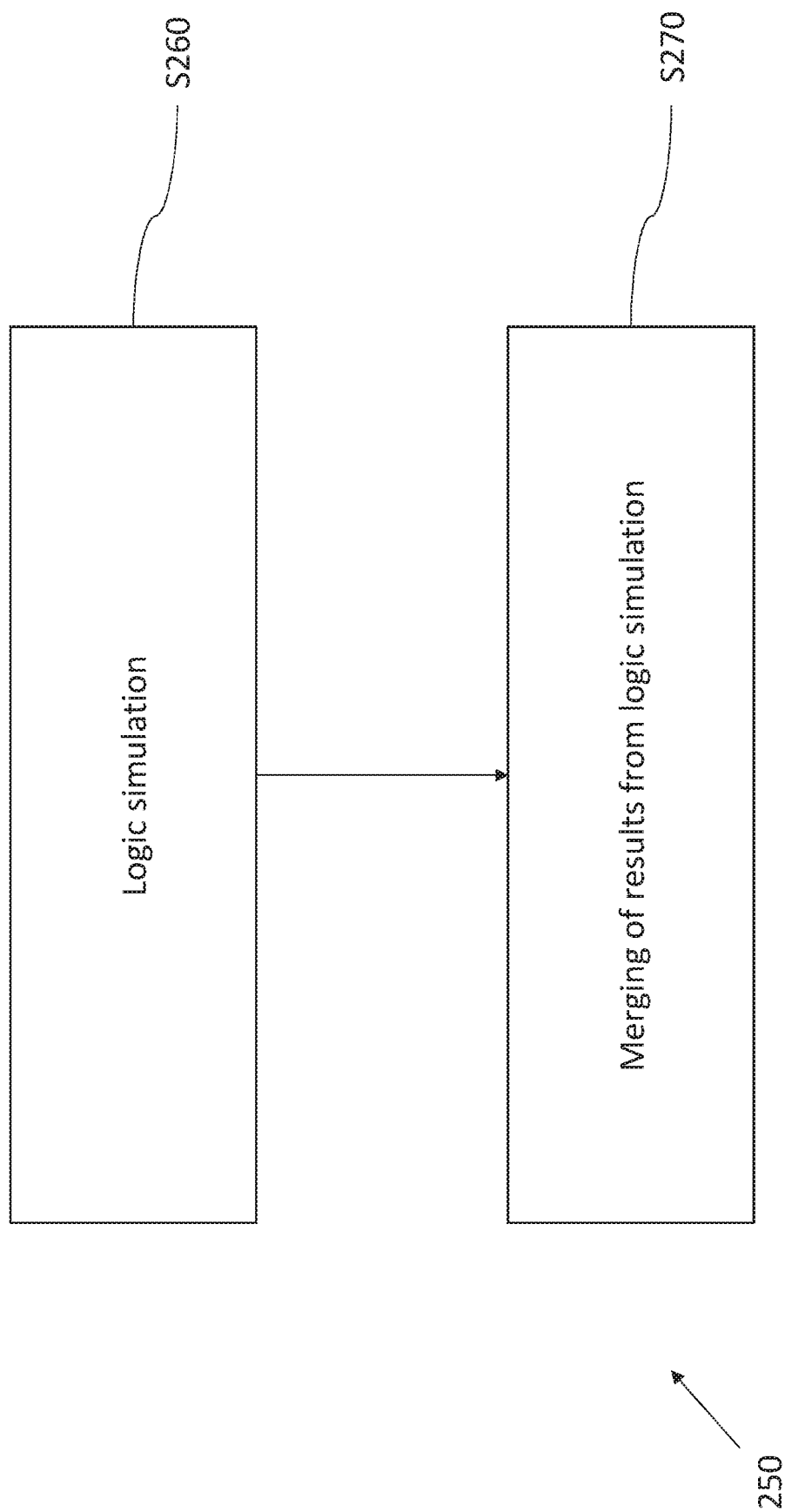
FIG. 2A illustrates the overall process of design verification.

Reference is made to FIG. 2A, which illustrates the two of the stages in the design verification process 250. Firstly, at S260, a logic simulation is performed using the HDL code. At S270, a merging of the results from the logic simulation is performed.

Figure 2B:
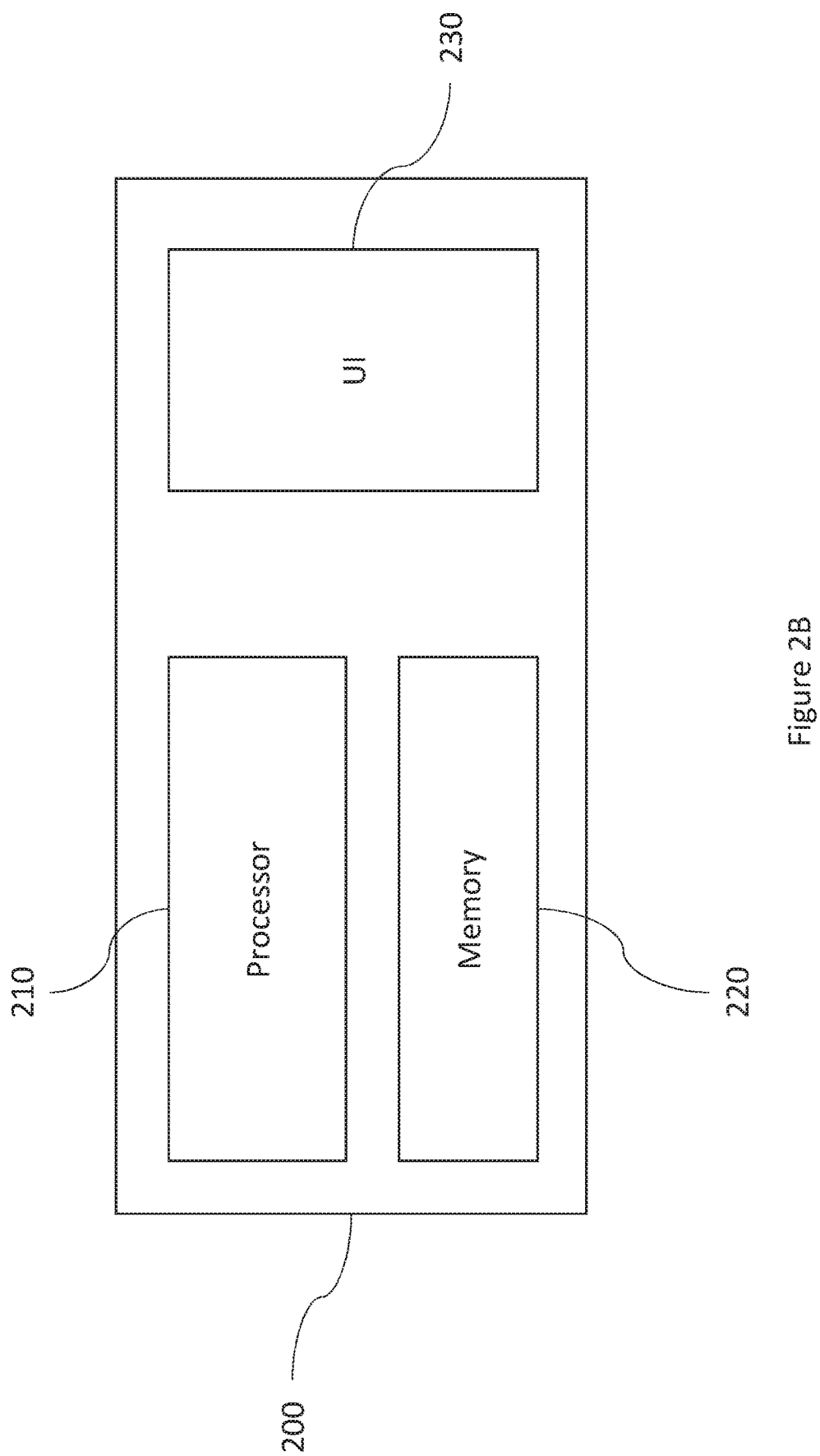
FIG. 2B illustrates an example of a system for performing the design verification by running a logic simulation.

Reference is made to FIG. 2B, which illustrates an example of a system 200 for performing the design verification process 250. The system 200 comprises at least one processor 210 and at least one memory 220. The memory 220 stores the DUV in the form of HDL code. The HDL code may be Verilog code. The memory 220 also stores any stimulus to be applied to the DUV and the results obtained from the logic simulation. The logic simulation may be run using electronic design automation (EDA) tools. The processor 210 randomly generates the stimulus for the logic simulation, applies the stimulus to the design, and obtains the results from applying the stimulus. The results comprise information as to the coverage for different coverpoints. The system 200 then merges the results from sets of identical functions blocks before reporting the coverage.

To perform its tasks, the processor 210 executes computer readable instructions stored in memory 220. A user interface 230 is provided in the system 200. The user interface 230 may comprise a display, keyboard, mouse, etc. The user interface 230 allows the user to exercise control over the verification process. Although in FIG. 2B, the processing circuitry 210 and memory 220 for performing the logic simulation are part of the same system 200 as the user interface 230, in some embodiments the processing circuitry 210 and memory 220 for performing the logic simulation may be part of a separate server that operates under the control of a host system comprising the user interface 230. Furthermore, although the system 200 is described as performing both the logic simulation S260 and the merging of the results from the logic simulation S270, in some cases the system 200 may receive the results of the logic simulation from another system and perform S270 without performing S260.

The DUV comprises a plurality of sets of identical function blocks. The memory 220 stores indications at to which function blocks are identical in the DUV. This information may be manually programmed as part of the DUV by the designer who writes the HDL code. The system 200 is configured to use the information identifying the sets of identical function blocks to identify certain equivalent coverpoints in the results obtained from the logic simulation. The system 200 then obtains a merged set of results for each set of identical functions blocks by setting the status of coverpoints in each merged set to be 'covered' in response to a determination that at least one equivalent coverpoint in the results from the logic simulation has been covered by the simulation. In other words, for a set of identical coverpoints in the results from the logic simulation, a corresponding coverpoint in the merged set of results is set to covered in response to a determination that any of the coverpoints in the set of identical coverpoints is covered.

Figure 1A:
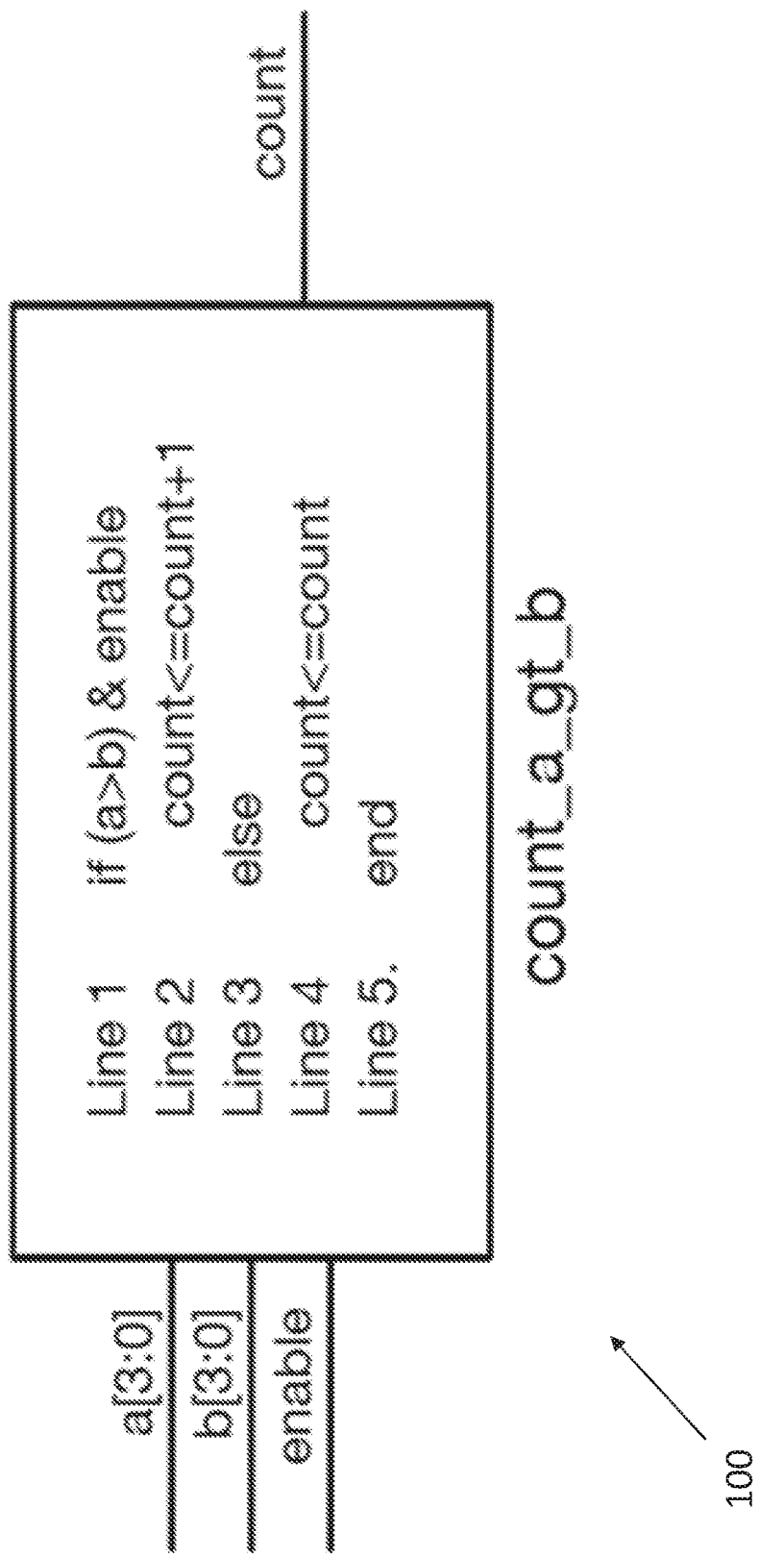
FIG. 1A illustrates an example of a function block that can increment a value in dependence upon its input parameters.

Returning to the example shown in FIG. 1A. The function block 100 may be repeated a plurality of times in the DUV. The system 200 stores information identifying the different instances of the function block 100 and merges the coverage in the results corresponding to these separate instances of the function block 100 to obtain merged coverage information for the function block 100.

Since the different instances of the function block 100 occur at different positions in the design, when the DUV is exposed to stimulus, the different instances of the function block 100 may receive different input values. As discussed earlier, FIG. 1C, illustrates an example of the coverage achieved when the restriction a=b is applied to the input values of the function block 100.

Reference is now made to FIG. 3, which illustrates results 300 showing the coverage achieved when the constraint a=b+1 is instead applied to the inputs of the function block 100. The input values resulting from the stimulus take all values possible with this constraint imposed. For this stimulus, enable takes each of the possible values, i.e. 0 or 1. Since the condition a>b is satisfied, the lines 1 and 2 are exercised and the coverpoints for these lines are covered. However, since a>b is satisfied for all inputs, the "else" condition in line 3 is never satisfied, and so line 4 is not exercised. For the conditional coverpoint, since a>b, the only coverbins hit for the conditional statement "(a>b) & enable" are those for which a>b is true. The coverage for the conditional coverpoint is, therefore, 50% (2 of 4). For the branch coverpoints, only one of the branches (the "(a>b) & enable" branch) in the code is taken. Therefore, only one of the two branch coverpoints is covered. For the toggle coverpoints, since values of a and b are varied and the count changes with each set of inputs supplied, each coverbin will be hit. Therefore, each toggle coverpoint is hit.

It is understood that, although there is some overlap in the coverage, some coverpoints are covered in results 160 but not results 300, and other coverpoints are covered in results 300 but not results 160. Given that the different instances of the function block 100 may, based on their different positions in the DUV, be exposed to different input values, it may be challenging to provide sufficient stimulus to independently provide full coverage for both instances of the function block 100. Therefore, the system 200 performs a merging of the coverage information of the two instances, and uses the results from the merge to obtain the overall coverage for the function block 100.

Reference is made to FIG. 4, which illustrates the results 400 of merging the coverage obtained for the two separate instances of the function block 100. The instance for which results are shown in results 160 is referred to here as instance A. The instance for which results are shown in results 300 is referred to here as instance B. As shown in the merged results 400, full coverage is achieved for each coverpoint. Line 1 is executed for both instances of the function block 100, and therefore is set as covered in the results 400. Line 2 is executed for instance B, and therefore is set as covered in results 400. Line 4 is executed for instance A, and is therefore set as covered in results 400. The branch "(a>b) & enable" is taken for instance B, and is therefore set as covered in results 400. The branch "Else" is taken for instance A, and therefore is set as covered in results. The toggle coverpoints for "a" and "b" are covered for both instances and therefore are set as covered in results 400. The toggle coverpoints for "count" are covered for instance B, and therefore is set as covered in results 400.

For the condition coverpoint "(a>b) & enable", for each instance coverage is only 50%. However, 50% coverage for the coverpoint in each instance is achieved by hitting different coverbins in each instance. Between the two instances, all coverbins are covered. Therefore, the coverage in the results 400 shown in FIG. 4 is set to 100%. It is, therefore, understood that coverage for a coverpoint in a set of equivalent coverpoints may be set to 100% (i.e. fully covered) in response to a determination that the instances each have partial coverage for the coverpoint that together covers all of the coverbins. In other words, a merging of the coverbins is performed, whereby a coverbin is covered in the merged results if any corresponding coverbin in the results for the instances of the function block is covered. For example the results 160 shown in FIG. 1C and the results 300 shown in FIG. 3, both show partial coverage for the conditional coverpoint "(a>b) & enable". However, examining the individual coverbins, it is seen that the partial coverage in each set of results 160, 300 is provided by coverage of different coverbins. In the case that a merging across coverbins is performed, the coverage of conditional coverpoint "(a>b) & enable" in the merged set of results is set to full coverage in this case.

In other embodiments, a different approach may be applied to the merging of coverpoints having only partial coverage. Instead of overlaying the coverage of different coverbins, the coverpoint in the merged set of results may be set to the highest coverage level of the corresponding coverpoints in the coverage information for each of the instances of the respective function block. For example, if a coverpoint has 25% coverage in the results for a first instance, 75% coverage in the results for a second instance, and 50% coverage in the results for a third instance, in the merged set of results, the corresponding coverpoint would be set to have a coverage level of 75%.

The system 200 is configured to store information identifying the different instances of identical function blocks for which the merging of coverage described above is performed. This information is stored separately to the HDL code. The information may take the form of path information specifying the location in the design hierarchy of the respective function blocks. The path information can take the form of a regular expression.

Figure 7:
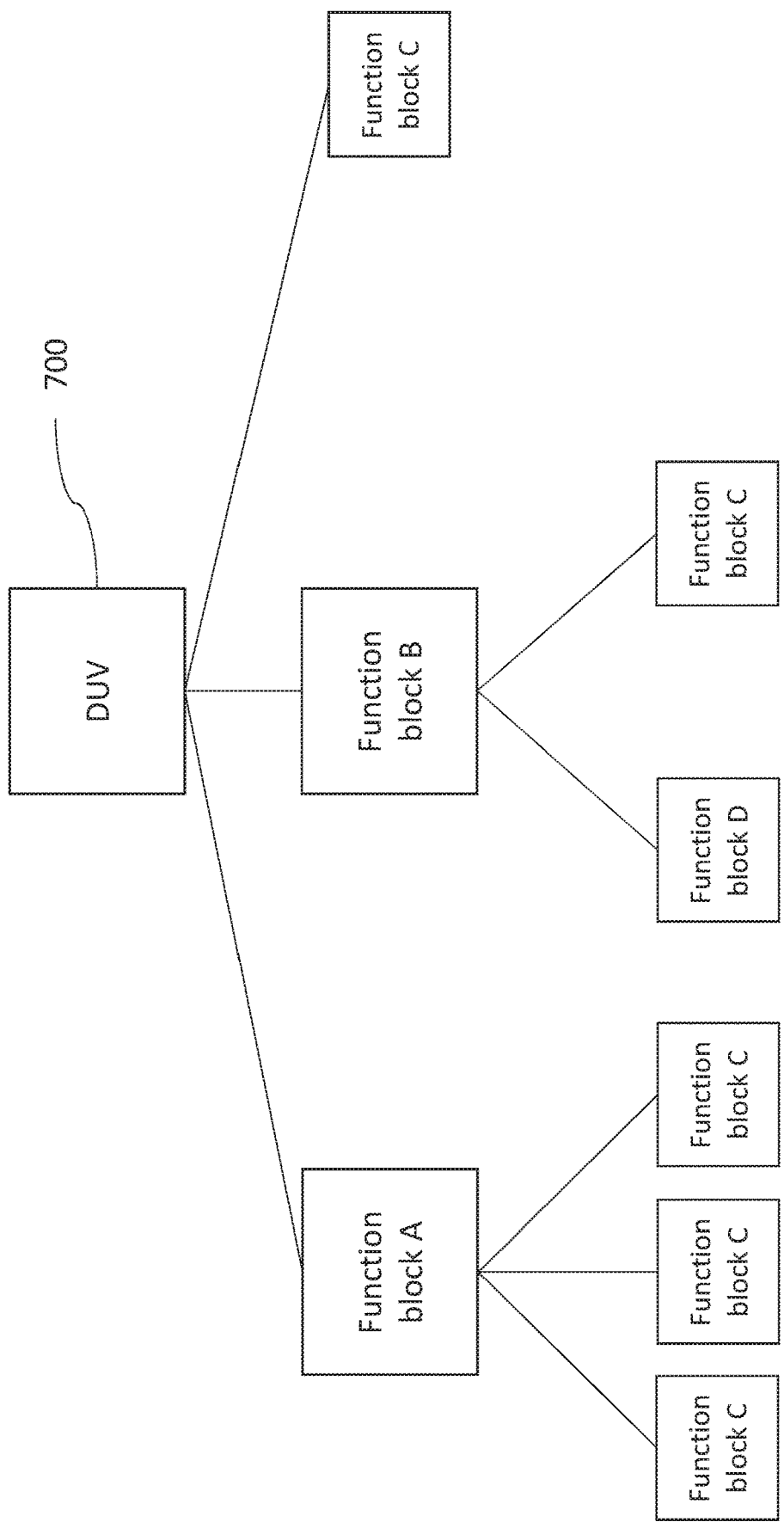
FIG. 7 illustrates an extremely simplified hierarchical design under verification.

Reference is made to FIG. 7, which illustrates an extremely simplified example of a design hierarchy for a DUV 700. The DUV 700 is expressed at the register transfer level. As shown, the DUV 700 comprises a plurality of function blocks that are arranged at different levels. At the next lowest level, the DUV 700 comprises function blocks A, B, and C. Each of these function blocks is distinct and comprises different HDL code. Function block C does not itself comprise any further function blocks at the register transfer level, but is one of the fundamental building blocks of the hierarchy. In the case that the HDL code is Verilog, function block C is a Verilog module. Function block C could be the function block 100 illustrated in FIG. 1A.

Function blocks A and B each comprise lower level function blocks. Function block A comprises three instances of function block C. Function block B comprises an instance of function block C and an instance of function block D. In this example, function block D, like function block C, does not itself comprise any further function blocks at the register transfer level.

Therefore, the example DUV 700 comprises five instances of function block C. The path information identifying the instances of function block C may take the form of one or more regular expressions. For example, a regular expression identifying the function blocks C that are part of function block A may comprise:

DUV_middle[0]_inst[0-2]

This expression identifies all of the blocks at positions 0-2, in the $0^{th}$ block of the DUV. Such a regular expression can be expanded to cover the paths of the other instances of function block C in the design hierarchy of the DUV 700.

The results that are produced by the logic simulation are also arranged in a hierarchical manner. Reference is made to FIG. 8, which illustrates a hierarchical arrangement of the results 800 of the logic simulation. The results comprise coverage information that is produced for each of the fundamental blocks, i.e. function blocks C and D, in FIG. 7. One of the sets 810 of coverage information could, for example, consist of the results 300 shown in FIG. 3.

Each of the sets 810 of coverage information provides coverage information for a corresponding function block of the DUV 700 in FIG. 7. Each of the sets 810 of coverage information is also associated with the same path information of its corresponding function block. This path information is stored as part of the results output by the logic simulation. The system 200 uses the information identifying the paths, e.g. the regular expression, of a set of identical function blocks to search through the results 800 to identify the corresponding sets 810 of coverage information in the results 800. For example, if the regular expression, DUV_middle[0]_inst[0-2], as discussed above, is applied to search through the results 800, coverage info C2, coverage info C3, and coverage info C4 are identified in the results. An expanded or additional regular expression may be used to identify the remaining sets 810 of coverage info—i.e. coverage info C1, and coverage info C5—corresponding to the instances of function block C. Hence, by searching the results 800 using a regular expression, sets of results for equivalent function blocks can be identified.

Once the coverage information for each set of identical function blocks has been identified by searching the results as described, a merged set of results is produced. As already described, this is achieved by, for each set of identical function blocks, producing a single set of coverage information from the sets of coverage information for each individual one of those function blocks obtained from the logic simulation. In the single set of coverage information, coverpoints are set as covered if at least equivalent coverpoint in the sets of coverage information obtained from the logic simulation is covered.

The system 200, therefore, applies the merging for sets of identical function blocks. For function blocks for which there are not multiple identical instances in the DUV, the system 200 is configured to not perform merging for the coverage information for those function blocks, but to include in the end results obtained following the merging performed for the sets of identical function blocks, the original coverage information for those function blocks as output by the logic simulation.

In some embodiments, after performing the merging of coverage for identical function blocks, the system 200 outputs coverage information to the user. Based on this information, the user determines whether or not further stimulus is required. If so, the user causes the system 200 to apply further stimulus to the DUV to obtain further results from the logic simulation. The system 200 merges the further results from the logic simulation with the earlier merged set of results to obtain a further merged set of results. This further merging is performed as described above, i.e. by setting a coverpoint in the further merged results to covered in response to a determination that an equivalent coverpoint in the earlier merged set of results or in the further results from the logic simulation is covered. The system 200 continues to repeat this process until the required coverage is obtained in the merged results.

In some embodiments, it is not necessary to obtain full coverage for the DUV, since a waiver can be applied to certain coverpoints. When waivers are applied to certain coverpoints, the system 200 will determine that the DUV is verified when coverage is achieved for all coverpoints that are not subject to the waivers. The DUV is then verified even though coverage is not achieved for the coverpoints to which waivers are applied. In some cases, the DUV will fail verification if the coverage is achieved for the waived coverpoints. The use of waivers is useful when the user knows that certain HDL code in the design cannot be executed irrespective of the stimulus provided.

Each waiver is applied using a regular expression. The regular expression applies to a particular coverpoint in the results of the logic simulation for the DUV. For instance, a regular expression may take the form "instance_block_1_line2". In this case, line 2 of an identified function block (referred to as function_block_1) is waived and does not have to be exercised for the design to be verified.

A waiver can be applied to all equivalent coverpoints in a set of identical function blocks. In this case, a regular expression is defined that applies to the equivalent coverpoints in the results for a set of identical function blocks. For example, a regular expression may take the form "instance[1 . . . X]_line2". In this case, coverage of line 2 in each of the instances (referred to as instance[1 . . . X]) of the same function block is waived and verification is achieved without exercise of line 2 in any of those instances.

In the case that a waiver is applied to all equivalent coverpoints in a set of identical function blocks, the waiver is effectively applied to the corresponding coverpoint in the merged set of results for a set of identical function blocks.

The techniques may be applied to a design for a data processing device comprising a plurality of hardware modules. The hardware modules may be the same or substantially the same, such that the function blocks used in each hardware module are repeated in each hardware module. The technique of merging coverage for identical function blocks is particularly effective in this case, since there will be a large number of duplicated functions blocks in the DUV.

Figure 5:
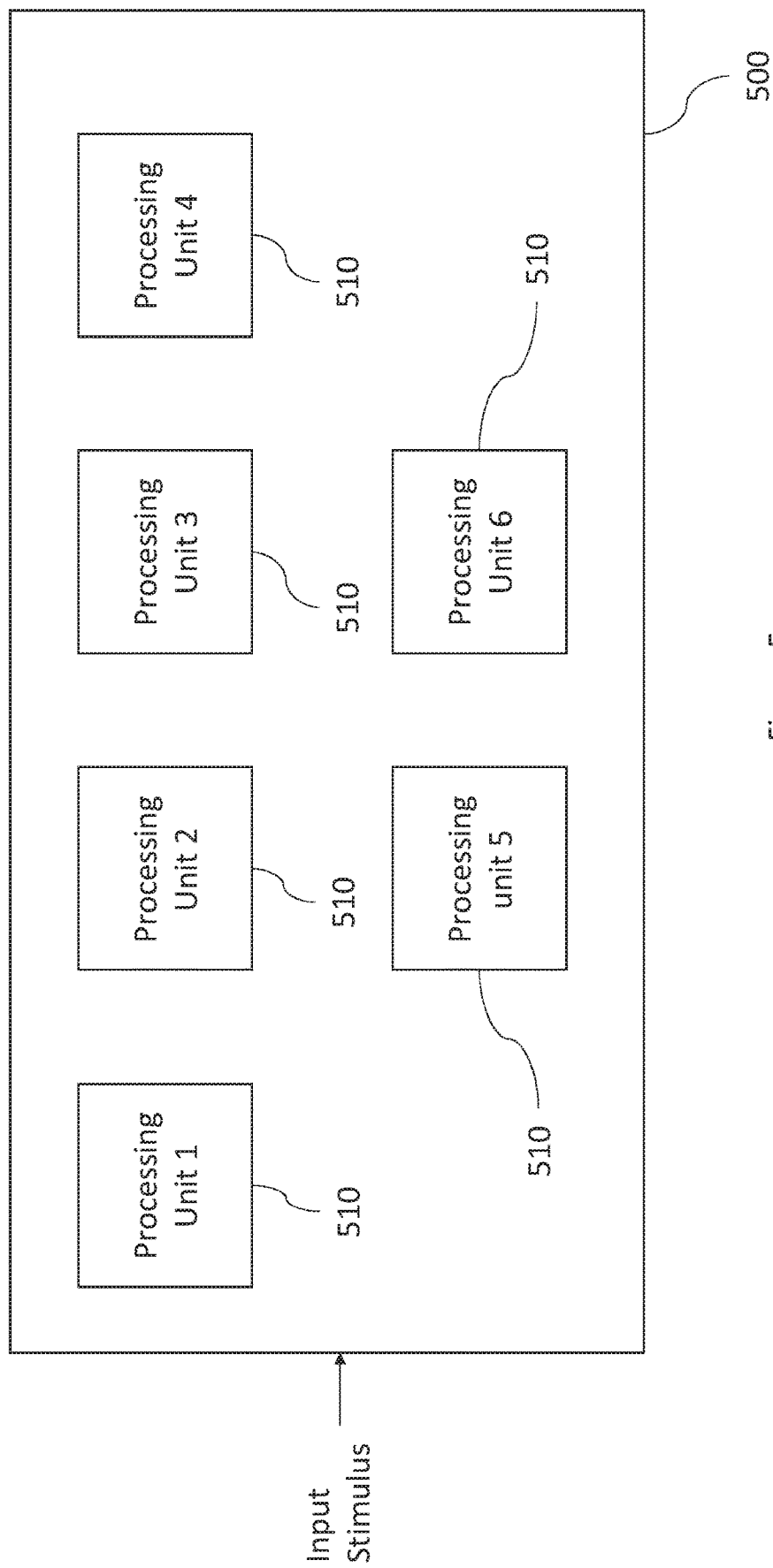
FIG. 5 illustrates an example of a data processing device for which the design is verified.

Reference is made to FIG. 5, which illustrates an example data processing device 500 comprising a plurality of hardware modules 510. The design for the data processing device 500 is an example of a DUV to which the techniques described herein may be applied. The hardware modules 510 are shown as processing units. It would be appreciated that the data processing device 500 may include additional components, other than the hardware modules 510, which are not shown. The data processing device 500 may be part of an integrated circuit comprising other components. In some embodiments, the data processing device 500 is a tile processor of the Intelligence Processing Unit (IPU) as described in our earlier filed U.S. application Ser. No. 15/886,065, which is herein incorporated by reference. The hardware modules 510 may be duplicated hardware modules for processing associated threads running on the tile processor. The hardware modules 510 themselves may comprise duplications of many types of processing circuits, such as many adders and multipliers.

Embodiments are particularly effective when applied to processing devices for performing massively parallel computation, since in this case there is a large amount of duplicated hardware, allowing for the possibility of merging large sets of identical function blocks. A tile of the IPU uses such massively parallel capabilities for machine learning purposes.

When performing the logic simulation, input stimulus is provided to the design for the data processing device 500 as shown in the FIG. 5. The input stimulus may be transported and/or processed in such a way that each of the hardware modules 510 receives different input values. Therefore, the coverage that is independently obtained for each of the hardware modules 510 is not identical. By merging the coverage obtained in the simulation for different hardware modules, the required coverage for each of the hardware modules 510 is obtained in a significantly reduced time than if the simulation were required to independently obtain full coverage for each hardware module.

Figure 6:
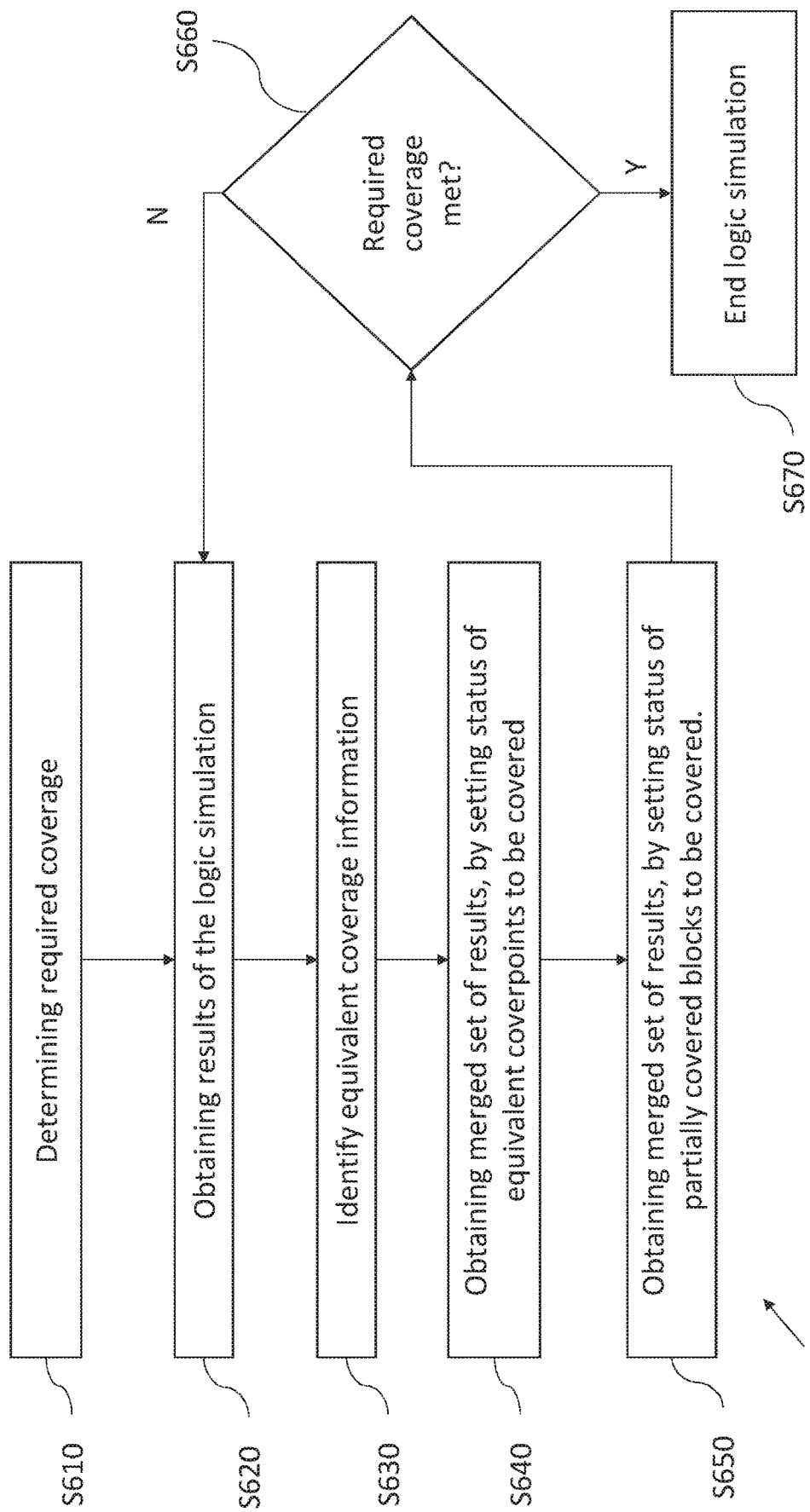
FIG. 6 illustrates a method for design verification according to embodiments of the application.

Reference is made to FIG. 6, which illustrates an example of a method 600 according to embodiments of the application. The method is implemented in system 200. It would be appreciated that the method 600 is an example only. Some of the steps shown may be optional. Furthermore, in some examples, the order of the steps may vary from the order shown in FIG. 6.

At S610, the system 200 determines the coverage required for verification of the design. This is user defined. In some cases, verification may require full coverage of the merged set of results. However, in other cases, certain coverpoints may be waived, such that coverage for these coverpoints is not required in order to verify the design. In order to waive these coverpoints a regular expression is defined that identifies the waived coverpoints. Waived coverpoints may belong to function blocks that are repeated in the design (i.e. they belong to a set of identical function blocks).

At S620, the system 200 applies an amount of stimulus to the DUV and determines a set of results which indicate which coverpoints are covered. The results also include path information indicating for each set of coverage information, the path location of the function block in the DUV to which it corresponds.

At S630, the system 200 searches thorough the results obtained at S620 to identify sets of coverage information corresponding to different instances of identical function blocks. This search is performed using the path information, e.g. a regular expression, which identifies the location of the sets of identical function blocks in the DUV and the location of the corresponding coverage information in the results of the logic simulation.

In S640 and S650, the system 200 generates a merged set of results using the set of results obtained at S620. At S640, each of some of the coverpoints in the merged set of results are set as covered in response to a determination that at least one equivalent coverpoint is covered in the results obtained at S630. At S650, each of some of the coverpoints in the merged set of results is set as covered if the partial coverage attained by a set of equivalent coverpoints together provides full coverage for that coverpoint. S640 and S650 may be viewed as a single step in which coverbins are set as covered in response to a determination that equivalent coverbins are covered in the results obtained at S630. Alternatively, at S650, those coverpoints for which only partial coverage is indicated at the equivalent coverpoints in the logic simulation results are set to the maximum coverage of those equivalent coverpoints.

At S660, the system 200 determines whether the merged set of results has the required coverage determined in S620. This step comprises determining whether all of the coverpoints for which the waivers determined in S620 are not applied have been covered. If the required coverage is attained, the method 600 proceeds to S670 at which point the logic simulation is complete since the design is verified. If the required coverage is not attained, the method 600 proceeds again to S620, at which point further stimulus is applied to the design to attempt to obtain the remaining coverage.

It will be appreciated that the above embodiments have been described by way of example only.

The invention claimed is:

1. A method for use in verification of a design under verification, the design under verification comprising a plurality of function blocks, the method implemented in a data processing system and comprising:
    obtaining results from a logic simulation of the design under verification, wherein the results comprise coverage information for each function block of at least some function blocks of the plurality of function blocks, wherein the design under verification comprises a plurality of sets of identical function blocks; and
    for each set of identical function blocks of at least some sets of the plurality of sets of identical function blocks, producing a merged set of results by:
        for each coverpoint of at least one coverpoint of a plurality of coverpoints in the merged set of results, setting a status for respective coverpoint of said at least one coverpoint of the plurality of coverpoints to be covered in response to determining that at least one equivalent coverpoint in the coverage information for the function blocks of respective set of identical functional blocks of said at least some sets of the plurality of sets of identical functional blocks has been covered in the logic simulation.

2. The method as claimed in claim 1, further comprising, for each set of identical function blocks of the at least some sets of the plurality of sets of identical function blocks, identifying in the results from the logic simulation, the coverage information for the function blocks of the respective set of said at least some sets of identical function blocks by searching the results using location information for the respective set of identical function blocks in the design under verification.

3. The method as claimed in claim 2, wherein the location information comprises a regular expression.

4. The method as claimed in claim 1, wherein the design under verification comprises a plurality of hardware modules for each set of identical function blocks of at least some sets of the plurality of sets of identical function blocks, wherein each the hardware module of the plurality of hardware modules comprises at least one function block of the function blocks of the respective set of identical function blocks.

5. The method as claimed in claim 4, wherein each hardware modules of the plurality of hardware modules is described by a same set of hardware description language code.

6. The method as claimed in claim 1, wherein the step of, for each set of identical function blocks of at least some sets of the sets of identical function blocks, producing a merged set of results comprises for each coverpoint of at least one coverpoint of a plurality of coverpoints in the merged set of results, setting a status for the respective coverpoint to be covered in response to determining that a full coverage has been achieved by a partial coverage for each of at least two equivalent coverpoints in the coverage information for the function blocks of the respective set of identical function blocks.

7. The method as claimed in claim 1, wherein the step of for each set of identical function blocks of at least some sets of the plurality of sets of identical function blocks, producing a merged set of results comprises for each coverpoint of at least one coverpoint of a plurality of coverpoints in the merged set of results, setting a status for the respective coverpoint to have a coverage level equal to a highest coverage level achieved by equivalent coverpoints in the coverage information for the function blocks of the respective set of identical function blocks.

8. The method as claimed in claim 1, further comprising reporting a coverage for the design under verification, wherein the reported coverage comprises:
    the merged sets of results for the at least some sets of the plurality of sets of identical function blocks; and
    the coverage information from the logic simulation for ones of the function blocks that are unique in the design under verification.

9. The method as claimed in claim 1, further comprising for each set of identical function blocks of at least one set of the plurality of sets of identical function blocks:
    applying a waiver to at least one coverpoint in the respective merged set of results such that a coverage by the logic simulation of that at least one coverpoint is not required for verification.

10. The method as claimed in claim 9, wherein the applying the waiver comprises searching the results from the logic simulation using a regular expression to identify the equivalent coverpoints of the respective at least one coverpoint not required for verification.

11. The method as claimed in claim 1, wherein the design under verification comprises Verilog code.

12. The method as claimed in claim 11, wherein each function block of the plurality of function blocks is a Verilog module.

13. The method as claimed in claim 1, wherein each set of identical function blocks of at least some sets of the plurality of sets of identical function blocks are expressed at the register transfer level in the design under verification.

14. The method as claimed in claim 1, wherein each coverpoint of the plurality of coverpoints is a coverpoint for at least one coverpoint of:
    a line of hardware description language code for the design under verification;
    an outcome of a conditional statement in the hardware description language code;
    a branch in the hardware description language code; and
    a toggle condition for a value used in one function block of the plurality of function blocks of the design under verification.

15. A data processing system for performing verification of a design under verification, the design under verification comprising a first function block and a second function block, the data processing system comprising at least one processor and at least one memory, the at least one processor configured to execute computer readable instructions stored in the at least one memory to perform:
    obtaining results from a logic simulation of the design under verification, wherein the results comprise coverage information for the first function block and the second function block, wherein the first function block and the second function block are identical function blocks; and producing a merged set of results for the first function block and the second function block by:
for a first coverpoint of a plurality of coverpoints, setting a status to be covered in response to determining that an equivalent coverpoint in the coverage information has been covered in the logic simulation.

16. A non-transitory computer readable medium configured to store a computer program which, when executed by a processor causes a method for verification of a design under verification to be carried out, the design under verification comprising a first function block and a second function block, wherein the method comprises:

obtaining results from a logic simulation of the design under verification, wherein the results comprise coverage information for the first function block and the second function block, wherein the first function block and the second function block are identical function blocks; and producing a merged set of results for the first function block and the second function block by:
for a first coverpoint of a plurality of coverpoints, setting a status to be covered in response to determining that an equivalent coverpoint in the coverage information has been covered in the logic simulation.

* * * * *